United States Patent
Zurke et al.

(10) Patent No.: US 9,261,015 B2
(45) Date of Patent: *Feb. 16, 2016

(54) CONTROL DEVICE FOR INTERNAL COMBUSTION ENGINES

(75) Inventors: Janusz Zurke, Straelen (DE); Max Hermann, Neuss (DE)

(73) Assignee: PIERBURG GMBH, Neuss (DE)

(*) Notice: Subject to any disclaimer, the term of this patent is extended or adjusted under 35 U.S.C. 154(b) by 451 days.

This patent is subject to a terminal disclaimer.

(21) Appl. No.: 13/704,628

(22) PCT Filed: May 25, 2011

(86) PCT No.: PCT/EP2011/058567
§ 371 (c)(1),
(2), (4) Date: Dec. 17, 2012

(87) PCT Pub. No.: WO2011/157521
PCT Pub. Date: Dec. 22, 2011

(65) Prior Publication Data
US 2013/0092134 A1    Apr. 18, 2013

(30) Foreign Application Priority Data
Jun. 18, 2010  (DE) .......................... 10 2010 024 297

(51) Int. Cl.
*F02B 33/44*  (2006.01)
*F16K 31/12*  (2006.01)
(Continued)

(52) U.S. Cl.
CPC ................ *F02B 37/16* (2013.01); *F04D 25/04* (2013.01); *F04D 27/001* (2013.01); *F16K 31/402* (2013.01); *F16K 31/406* (2013.01); *Y02T 10/144* (2013.01)

(58) Field of Classification Search
CPC ....... F02B 37/16; F04D 25/04; F02D 27/001; F16K 31/404; F16K 31/402; F16K 31/406; F16K 31/408; F16K 31/365; G01F 1/40; G01F 1/42; E03D 3/06; Y02T 10/144
USPC ........ 60/611, 605.1; 251/30.01, 30.02, 30.03, 251/30.04; 137/487
See application file for complete search history.

(56) References Cited

U.S. PATENT DOCUMENTS 3,924,902 A * 12/1975 Engle ............................ 303/132
4,139,243 A *  2/1979 Landsman .................... 384/114
(Continued)

FOREIGN PATENT DOCUMENTS

DE       19 43 708 U     8/1966
DE       100 20 041 A1   10/2001
(Continued)

*Primary Examiner* — Thai Ba Trieu
(74) *Attorney, Agent, or Firm* — Norman B. Thot

(57) ABSTRACT

A control device for an internal combustion engine. The control device is arranged in a bypass duct between a pressure side and an intake side of a supercharging device. The control device includes a bypass valve comprising a valve-closure body which is configured to be pneumatically actuatable, and a control pressure space. A solenoid valve is configured so that a fluidic connection can be established and closed via the control pressure space between either the pressure side and the intake side or between the pressure side and the atmosphere: When the bypass valve is in a completely open position, the fluidic connection exists at least temporarily via the control pressure space between either the pressure side and the intake side or between the pressure side and the atmosphere. A closure of the fluidic connection brings about a resulting force in a closing direction on the valve-closure body.

25 Claims, 3 Drawing Sheets

(51) Int. Cl.
  *F16K 17/26* (2006.01)
  *F02B 37/16* (2006.01)
  *F16K 31/40* (2006.01)
  *F04D 25/04* (2006.01)
  *F04D 27/00* (2006.01)

(56) References Cited

U.S. PATENT DOCUMENTS

| | | | | |
|---|---|---|---|---|
| 4,534,537 | A | * | 8/1985 | Zukausky ................ 251/30.03 |
| 4,699,351 | A | * | 10/1987 | Wells ..................... 251/30.01 |
| 4,746,093 | A | | 5/1988 | Scanderbeg |
| 4,995,585 | A | * | 2/1991 | Gruber et al. ........... 251/30.03 |
| 5,048,790 | A | * | 9/1991 | Wells ..................... 251/30.04 |
| 5,119,795 | A | * | 6/1992 | Goto et al. ................. 123/564 |
| 5,205,323 | A | * | 4/1993 | Baker .................... 137/625.44 |
| 5,492,103 | A | * | 2/1996 | Goto .......................... 123/564 |
| 5,599,003 | A | * | 2/1997 | Seemann et al. ........ 251/30.03 |
| 6,076,550 | A | * | 6/2000 | Hiraishi et al. ......... 251/30.03 |
| 6,234,449 | B1 | * | 5/2001 | Ortner et al. ........... 251/30.03 |
| 6,290,203 | B1 | | 9/2001 | Kolze |
| 6,682,316 | B1 | * | 1/2004 | Boke ............................ 251/34 |
| 8,087,244 | B2 | * | 1/2012 | Hummel et al. ........... 60/605.1 |
| 2008/0276896 | A1 | * | 11/2008 | Koster et al. ............... 123/564 |
| 2009/0301080 | A1 | | 12/2009 | Hezel et al. |
| 2010/0051842 | A1 | * | 3/2010 | Mertens ................ 251/129.08 |
| 2013/0098340 | A1 | * | 4/2013 | Zurke et al. .................. 60/611 |

FOREIGN PATENT DOCUMENTS

| | | | | |
|---|---|---|---|---|
| DE | 102 50 397 | A1 | 5/2004 | |
| DE | 102 51 981 | A1 | 3/2005 | |
| DE | 10 2005 028 141 | A1 | 12/2006 | |
| DE | 10 2005 051 937 | A1 | 5/2007 | |
| DE | 10 2008 051 453 | A1 | 4/2010 | |
| EP | 416339 | A1 * | 3/1991 | .............. F16K 31/10 |
| GB | 2103391 | A * | 2/1983 | .............. F16K 31/08 |
| JP | 56-101023 | A | 8/1981 | |
| JP | 58-84332 | U | 6/1983 | |
| JP | 58-200031 | A | 11/1983 | |
| JP | 59-196523 | U | 12/1984 | |
| JP | 61-130722 | U | 8/1986 | |
| JP | 62-078430 | A | 4/1987 | |
| JP | 62-175231 | U | 11/1987 | |
| JP | 63-21325 | A | 1/1988 | |
| JP | 63-24327 | U | 2/1988 | |
| JP | 63-92884 | A | 4/1988 | |
| JP | 1-135275 | U | 9/1989 | |
| JP | 1-173579 | U | 12/1989 | |
| JP | 2-72283 | A | 3/1990 | |
| JP | 4-370324 | A | 12/1992 | |
| JP | 6-42585 | A | 2/1994 | |
| JP | 6-174136 | A | 6/1994 | |
| JP | 7-224962 | A | 8/1995 | |
| JP | 7-332518 | A | 12/1995 | |
| JP | 9-275061 | A | 10/1997 | |
| JP | 2009-513880 | A | 4/2009 | |

* cited by examiner

CONTROL DEVICE FOR INTERNAL COMBUSTION ENGINES

CROSS REFERENCE TO PRIOR APPLICATIONS

This application is a U.S. National Phase application under 35 U.S.C. §371 of International Application No. PCT/EP2011/058567, filed on May 25, 2011 and which claims benefit to German Patent Application No. 10 2010 024 297.7, filed on Jun. 18, 2010. The International Application was published in German on Dec. 22, 2011 as WO 2011/157521 A1 under PCT Article 21(2).

FIELD

The present invention relates to a control device for internal combustion engines which is arranged in a bypass duct between the pressure side and the intake side of a supercharging device, having a solenoid valve and a bypass valve with a pneumatically actuable valve-closing body and a control pressure space, wherein, via a solenoid valve, a fluidic connection can be established and closed between the pressure side and the intake side of the supercharging device or atmosphere via the control pressure space of the bypass valve.

BACKGROUND

Control devices for the recirculation of compressed combustion gas from the pressure side of a compressor of a supercharging device back to the intake side of the compressor are generally known as divert-air valve devices. The connection between the pressure side and the intake side of the compressor via a bypass line is necessary for the transition from a high load to the thrust mode of the internal combustion engine, so as to prevent a high delivery of the pressure boost pump against a closed throttle flap and the resulting pumping effect, as well as to prevent an excessive sudden drop in the turbocharger speed entailing thermodynamic problems.

Divert-air valves are often actuated electromagnetically, the valve-closure body of the valve being moved by the electromagnetic force. An example for such an arrangement is described in DE 100 20 041 A1 in which a control unit effects control according to given engine data. The valve has a pressure equalizing opening at the valve-closure body, whereby, given a corresponding design of the effective surfaces, an equilibrium of forces is obtained with respect to pneumatic forces. These valves, however, have a drawback in that, despite the pressure equalization of the valve, a large actuating force is required to actuate the valve-closure member during opening, which is why large solenoids must be used, especially when large cross sections must be controlled. At the same time, limitations exist with respect to the opening times that can be achieved.

In the interest of reducing the required magnetic force, DE 102 51 981 A1 describes providing a pneumatically operated divert-air valve whose pressure space is adapted to be connected with the intake side of the compressor via a solenoid valve. This leads to an opening of the valve. However, the differential pressure responsible therefore drops in the open state so that an inadvertent closing of the valve can occur.

DE 10 2005 028 141 A1 describes a bypass valve for internal combustion engines in which an opening of the valve-closure body is produced by lifting a sealing plate electromagnetically from openings via which a fluidic connection of the control pressure space with the intake side of the compressor can be established. In addition, a constant connection between the control pressure space and the pressure side through a pressure equalization opening in the valve-closure body here exists. However, since the latter has a smaller cross section than the openings to the suction side, a force is generated in the opening direction which causes the valve-closure body to open. In the open state, however, the valve-closure body again contacts the sealing plate so that a pressure equilibrium comes to prevail at the valve-closure body. This may lead to an inadvertent closing of the valve due to a spring force acting in the closing direction. The pressure thereafter builds again so that the valve again opens because of the differential pressure. A control circuit with an opening and closing valve is formed, which leads to increased wear.

SUMMARY

An aspect of the present invention is to provide a control device with which the above-mentioned disadvantages can be avoided and a defined position of the valve-closure body is provided in the activated state of the solenoid.

In an embodiment, the present invention provides a control device for an internal combustion engine. The control device is arranged in a bypass duct between a pressure side and an intake side of a supercharging device. The control device includes a bypass valve comprising a valve-closure body which is configured to be pneumatically actuatable, and a control pressure space. A solenoid valve is configured so that a fluidic connection can be established and closed via the control pressure space between either the pressure side and the intake side or between the pressure side and the atmosphere: When the bypass valve is in a completely open position, the fluidic connection exists at least temporarily via the control pressure space between either the pressure side and the intake side or between the pressure side and the atmosphere. A closure of the fluidic connection brings about a resulting force in a closing direction on the valve-closure body.

BRIEF DESCRIPTION OF THE DRAWINGS

The present invention is described in greater detail below on the basis of embodiments and of the drawings in which.

DETAILED DESCRIPTION

Figure 1:
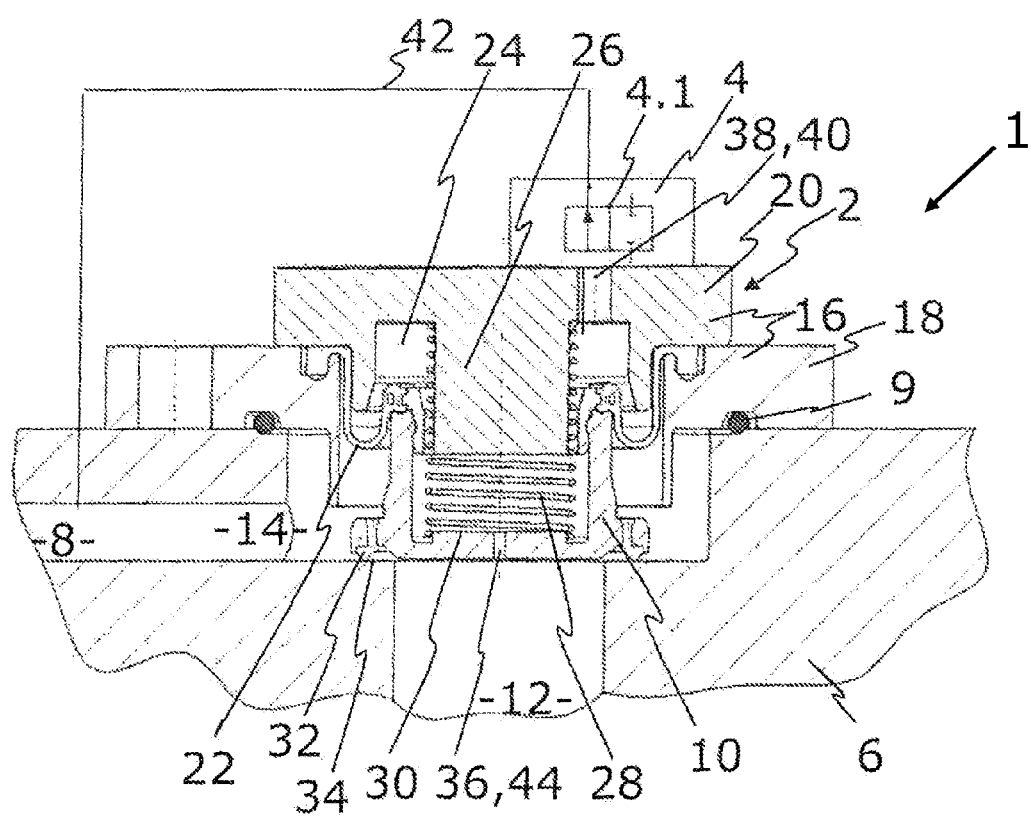
FIG. 1 shows a side elevational and a sectional view of a control device according to the present invention comprising a bypass valve and a solenoid valve represented by a symbol.

By the fact that, in the fully opened state of the bypass valve, a fluidic connection exists at least temporarily between the pressure side and the intake side of the supercharging device or atmosphere via the control pressure space and that, by closing the fluidic connection, a resultant force acts on the valve-closure body in the closing direction, it is achieved that the bypass valve can be opened and closed in a defined manner. An undesirable closing or pulsating of the valve-closure body is reliably avoided.

In an embodiment of the present invention, the cross section that can be opened via the solenoid valve can, for example, be larger than the cross section of the fluidic connection between the pressure side of the supercharging device and the control pressure space. It is thus provided that, with the fluidic connection to the intake side or to atmosphere open, the pressure in the control pressure space is always lower than the pressure beneath the valve-closure body. The fluidic connection to the pressure side here has a cross section acting as a throttle, causing a driving pressure gradient.

For this purpose, at least one opening is formed at the valve-closure device via which the fluidic connection between the pressure side of the supercharging device and the control pressure space is established. This throttle or orifice is thus formed in a particularly simple manner.

In an embodiment of the present invention, the solenoid valve, in the open state of the bypass valve can, for example, open a constant cross section between the control pressure space and the intake side of the supercharging device or atmosphere that is larger than the at least one opening in the valve closure body. In this manner, the presence of a pressure gradient is provided in the open state and thereby an undesirable closing is again prevented in a simple manner. A constant opening allows for the use of simple and economic solenoid valves.

In an embodiment of the present invention, the solenoid valve can, for example, be an electric switch-over valve. These allow for very quick opening times and have a robust structure.

In an embodiment of the present invention, the cross section, which can be cleared between the control pressure space and the intake side of the supercharging device or atmosphere via the solenoid valve, can, for example, be adjustable. It thus becomes possible to achieve a continuous control of the opening cross section of the bypass valve since a pressure, and thus a force, can be produced in the control pressure space for each position of the valve-closure device which corresponds to a spring force corresponding to this position. An equilibrium of forces can thus be achieved in each position so that full controllability of the bypass valve is obtained.

In an embodiment of the present invention, the solenoid valve can, for example, be an electro-pneumatic pressure transducer. An electro-pneumatic pressure transducer is particularly well suited to realize the necessary mixed pressures for controlling the pressure in the control pressure space and thus for controlling the bypass valve.

The mixed pressure port of the electro-pneumatic pressure transducer can, for example, be connected with the control pressure space of the bypass valve. The other ports may be connected, for example, with the pressure side of the compressor. This results in a simple controllability and assembly. Such an interconnection leads to a stroke control since a constant differential pressure is set between the control pressure space and the pressure side of the supercharging device, which differential pressure leads to a constant opening cross section of the bypass valve.

In an embodiment of the present invention, a mixed pressure port of the electro-pneumatic pressure transducer can, for example, be connected with the atmosphere or the intake side of the supercharging device, and a pressure-side port is connected with the control pressure space of the bypass valve. This arrangement causes a constant opening cross section between the control pressure space and the intake side or atmosphere when the pressure transducer is actuated. The pressure in the control pressure space thus changes as a function of the pressure change on the pressure side of the supercharging device. This makes it possible, for example, to even pressure pulsations of the supercharging device and corresponds to a pressure control of the bypass valve.

In an embodiment of the present invention the bypass valve can, for example, be pressure compensated in the closed state so that the resultant force exerted by the pneumatic forces acting on the valve-closure body is equal to zero in the closed state of the bypass valve. This reduces the required opening forces so that a particularly quick opening is achieved.

In an embodiment of the present invention, the control pressure space of the bypass valve can, for example, be arranged between a membrane connected with the valve-closure body and a housing of the bypass valve. Such a configuration has a particularly simple structure and can thus be manufactured and assembled economically.

These embodiments of the present invention provide a control device for internal combustion engines that avoids the above-mentioned drawbacks of known designs, prevents an incorrect closing or a pulsating of the valve-closure body of the bypass valve, and possibly allows for full controllability. A defined position of the valve-closure body can thus be moved to, and a gas quantity can be controlled, respectively. The structure is simple and robust and the controllable cross sections of the bypass valve are large. A reliable and quick switching is provided, while only low necessary actuating forces must be generated.

Embodiments are illustrated in the drawings and will be described hereinafter.

Figure 3:
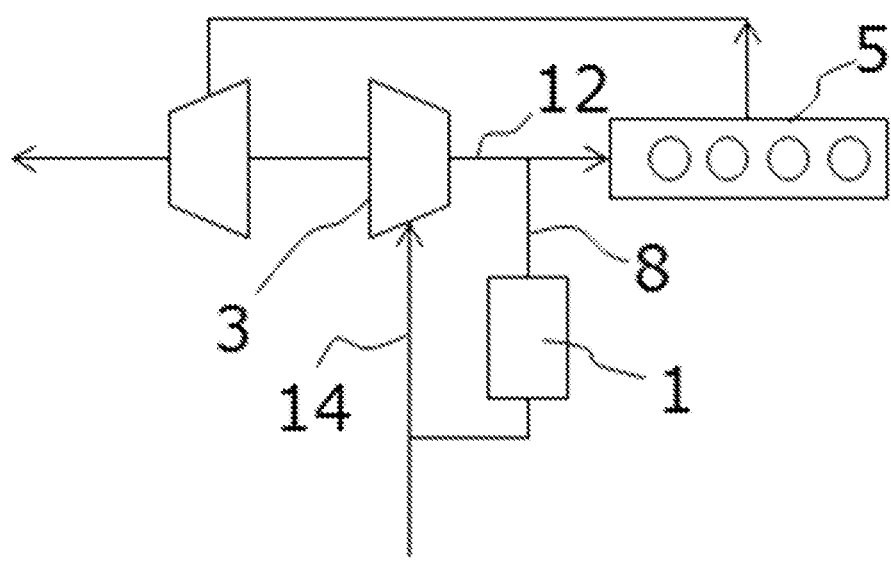
FIG. 3 shows the control device for an internal combustion engine arranged in a bypass duct between a pressure side and an intake side of a supercharging device.

The control device 1 illustrated in FIG. 1 comprises a bypass valve 2, which in the present embodiment is used as a divert-air valve, with a solenoid valve 4 mounted thereto and corresponding thereto, the device being flanged, with the interposition of a seal 9, as a unit directly to a duct-forming housing 6 of a bypass duct 8, serving as a recirculation duct 8, of a supercharging device 3 (not shown in greater detail) for an internal combustion engine 5 (see FIG. 3). The recirculation or bypass duct 8 may be formed either directly in the housing of the supercharging device or as an external duct.

A valve-closure body 10 of the bypass valve 2 separates a pressure side 12 on which the valve-closure body 10 rests, from a laterally adjacent suction side 14 of the recirculation duct 8 of the supercharging device 3.

The bypass valve 2 is further formed by a valve housing 16 connected to the housing 6 of the recirculation duct 8, e.g., by means of screws, with interposition of a seal 18. The valve housing 16 is of a bipartite structure, where a first housing part 18, via which a connection with the housing 6 of the recirculation duct is established, delimits the bypass valve 2 laterally, and a second housing part 20, which serves as a cover, delimits the bypass valve 2 on the side opposite the valve-closure body 10. An outer peripheral edge of a membrane 22 is clamped between the first and second housing parts 18, 20, the inner edge thereof being fastened to the valve-closure body 10. A control pressure space 24 is thus formed between the membrane 22 and the second housing part 20 serving as a cover.

A cylindrical projection 26 extends from the second housing part 20 into the control pressure space 24, which serves as a guide for a spring element 28 whose first end abuts on the second housing part 20 and whose second end abuts on the valve-closure body 10, the inner surface of which is also provided with a protrusion 30 for receiving the second end of the spring element 28. This spring element 28 is arranged in the control pressure space with a bias so that a force is generated on the valve-closure member 10 in the closing direction.

In the closed state, a sealing lip 32 of the valve-closure body 10 rests on a valve seat 34 formed in the housing 6. An opening 36 is formed centrally in the valve-closure body 10, via which the space beneath the valve-closure body 10, i.e., in the closed state, the pressure side 12 of the supercharging device 3, is fluidically connected with the control pressure space 24. As a consequence, when the valve housing 16 is closed, the same pressure prevails in the control pressure space 24 as on the pressure side 12 beneath the valve-closure body 10. In order to obtain a bypass valve 2 that is pressure compensated with respect to the pneumatic forces, at least in the closed state, the pressure-loaded effective surface of the valve-closure body 10 and of the membrane 22, seen from the side of the control pressure space 24, corresponds to the effective surface below the valve-closure body 10 up to the sealing lip 32. As a result, the bypass valve 2 is maintained in the closed state by the spring force applied.

In order to also be able to open the bypass valve 2, the second housing part 20 is formed with an opening 38 that is fluidically connected with an inlet of the solenoid valve 4. The solenoid valve 4 illustrated in FIG. 1 is an electric switch-over valve 4.1 through which, when the solenoid is actuated or the coil is energized, a cross section 40 is cleared in a manner known per se, via which a fluidic connection is made between the control pressure space 24 and the intake side 14 of the recirculation duct 8. In FIG. 1, this cross section is illustrated in an exemplary manner as the obvious connection cross section in the second housing part 20, but it may also be situated within the solenoid valve 4. For this purpose, a line 42 is provided at the outlet of the electric switch-over valve 4.1, the opposite end of the line leading through the housing 6 to the recirculation channel 8.

The smallest cross section 40 of this fluidic connection between the control pressure space 24 and the intake side 14 of the supercharging device 3 must be chosen larger than the cross section 44 of the opening 36.

As a result, when the solenoid valve 4 is energized and the cross section 40 is thus opened, the gas present flows from the control pressure space 24, where the pressure is higher than on the intake side 14 of the supercharging device 3, towards the intake side 14. At the same time, the quantity of inflowing gas is smaller due to the smaller cross section 36, so that a pressure decrease occurs in the control pressure space 24, whereby a pressure gradient occurs at the valve-closure body 10 that leads to a resultant force at the valve-closure body 10 and the membrane 22, respectively, acting in the opening direction of the bypass valve 2. Accordingly, the valve closure body 10 is lifted off the valve seat 34 and the bypass valve 2 opens.

If, thereafter, the differential pressure between the pressure side 12 and the intake side 14 in the recirculation duct 8 shifts towards a pressure equalization, i.e., if the pressure gradient in the duct 8 decreases, the pressure in the control pressure space 24 also decreases, since gas under lower pressure flows in through the opening 36. However, due to the different cross sections 40, 44, a pressure gradient always exists in the open state of the electric switch-over valve 4.1, which pressure gradient provides that the bypass valve 2 no longer closes inadvertently.

When the electric switch-over valve 4.1 is closed again, a pressure equalization occurs between the lower side of the valve-closure body 10 and the control pressure space 24. This results in a pneumatic pressure equalization and thus in a force equilibrium with respect to the pneumatic forces. As a consequence, the bypass valve 2 is closed due to the force exerted by the spring element 28. This state of pressure equalization prevails until the cross section 40 is again opened by the switch-over valve 4.1.

Figure 2:
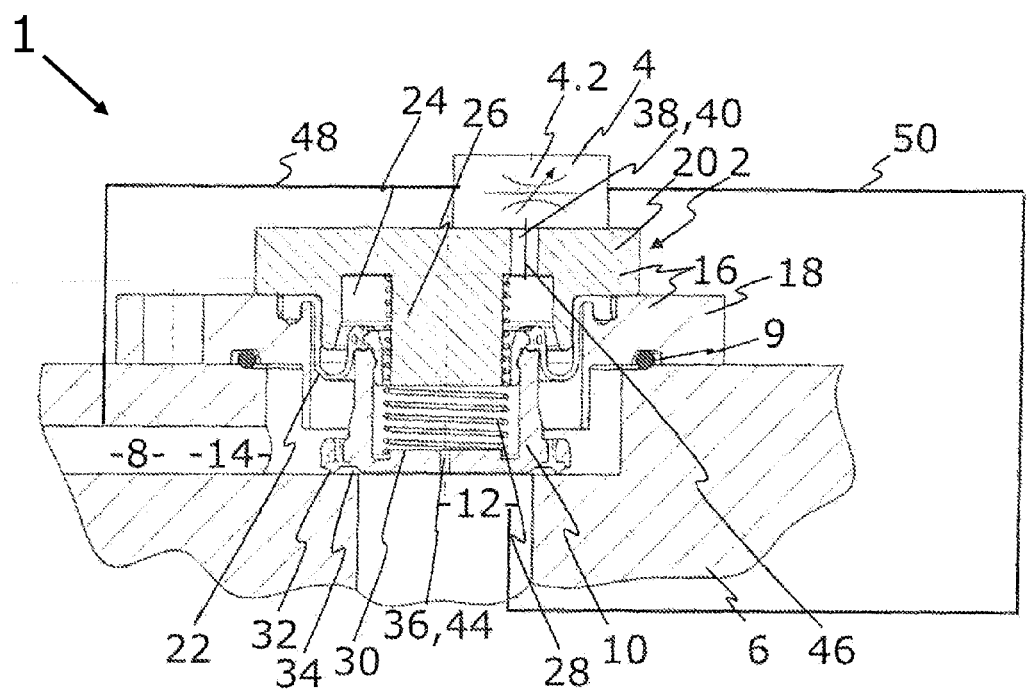
FIG. 2 shows a side elevational and a sectional view of a control device according to the present invention comprising the bypass valve of FIG. 1 and an alternative solenoid valve represented by a symbol.

The control device 1 illustrated in FIG. 2 differs from the one illustrated in FIG. 1 only in the solenoid valve 4 used, as well as in the ports thereof so that similar elements are identified by similar reference numerals.

Instead of the switch-over valve 4.1, an electro-pneumatic pressure transducer 4.2 is connected with the opening 40 in the second housing part 20 by its mixed pressure port 46. The two other ports of this electro-pneumatic pressure transducer 4.2 are connected with the intake side 14 and the pressure side 12 of the supercharging device 3 via lines 48, 50. Depending on the energization of the coil of the electro-pneumatic pressure transducer 4.2, a mixed pressure is generated from the pressures prevailing there, which mixed pressure prevails at the mixed pressure port 46. The inflow of the intake-side pressure or the pressure-side pressure into the mixed pressure space is regulated by a double seat valve in a manner known per se.

The respective connection of the mixed pressure space depends on the position of a valve plate, and thus on the position of a plunger. A movement of the valve plate is initiated by energizing the solenoid, i.e., by supplying current to the coil. Thus, the plunger is pulled toward a core, whereby the valve plate is lifted from a first valve seat so that the intake side pressure can flow into the mixed pressure space and thus to the mixed pressure port 46. This generates a force acting in the closing direction on a membrane, and thus on the plunger, since the pressure of the pressure side prevails on the opposite side of the membrane. The resulting movement of the plunger in the opposite direction again interrupts the connection between the intake side 14 and the mixed pressure space and the valve seat is opened, possibly, so that a connection with the pressure side 12 is made and the force acting on the membrane decreases again. This process is repeated until a mixed pressure corresponding to the electro-pneumatic force prevails in the mixed pressure space 24. An equilibrium is achieved, where the sum of the forces acting on the plunger becomes zero. Thus, these forces are the pulling force of the electromagnetic circuit, as well as the pneumatic forces acting on the membrane.

The solenoid or the coil, respectively, is supplied with a clocked direct voltage in the form of a pulse-width modulated signal. It is evident that another effective current is generated for each clock ratio of the pulse-width modulated signal, which current results in a magnetic force. For every magnetic force generated in this manner, the electro-pneumatic pressure transducer adjusts to a new mixed pressure in the mixed pressure space.

From this, it follows for the bypass valve 2 that a controllable pressure prevails in the control pressure space 24. When the cross section is fully closed, this pressure is the pressure from the pressure side 12 of the supercharging device 3. In order to open the valve 2, this pressure can be lowered down to the pressure present on the intake side 14, whereby the bypass valve 2 is fully opened, which is provided in the manner described with respect to FIG. 1. If, however, a mixed pressure is generated in the control pressure space 24 in the manner described, a pneumatic pressure gradient occurs at the valve-closure body 10. The magnitude of this pressure gradient can be adjusted by means of the electro-pneumatic pressure transducer 4.2 so that this pressure gradient can be set such that, for each position of the valve-closure body 10, a force equilibrium can be set between the spring force acting in the closing direction and the pneumatic force acting in the opening direction. These positions are clearly defined also by the different pressures, since the spring force increases continuously as the compression increases so that for each position of the valve-closure body 10, a resulting pneumatic pressure and a resulting spring force exists. A full controllability of the bypass valve 2 is the consequence thereof. Again, it is necessary that the maximum cross section 40 that can be cleared by the electro-pneumatic transducer 4.2 is larger than the opening 36 in the valve-closure body 10.

The present embodiments provide structures with which control devices are obtained that provide a defined opening and closing of the bypass valve. Full controllability can additionally be achieved. The necessary actuating forces are very low for large adjustable cross sections.

It should be noted that other designs of the control device than those described in connection with the embodiments are conceivable as well, without leaving the scope of protection of the main claim. For example, different electromagnetic valves can be used. Further, in all embodiments, the connection to the intake side of the compressor could also be a connection to any existing atmosphere port. Further, instead of the stroke control described in the context of FIG. 2, pressure control of the valve is also conceivable by connecting the mixed pressure port of the electro-pneumatic transducer to the intake side of the supercharging device and making the control pressure space connectable with the pressure side so that, upon energization, a respective defined cross section is cleared between the intake and the pressure side. Further, a comparable valve could also be used as a waste gate valve or as a divert-air valve. The structural design of the bypass valve could also be modified.

The present invention is not limited to embodiments described herein; reference should be had to the appended claims.

What is claimed is:

1. A control device for an internal combustion engine, the control device being arranged in a bypass duct between a pressure side and an intake side of a supercharging device, the control device comprising:
    a bypass valve comprising a valve-closure body which is configured to be pneumatically actuatable, and a control pressure space;
    a solenoid valve which is configured to open and close a fluidic connection between the pressure side and the intake side via the control pressure space; and
    a line connecting the solenoid valve with the intake side, wherein,
    when the bypass valve is in a completely open position, the fluidic connection exists at least temporarily via the control pressure space and the line between the pressure side and the intake side, and
    a closure of the fluidic connection brings about a resulting force in a closing direction on the valve-closure body.

2. The control device as recited in claim 1, further comprising a first cross section which is configured to be opened or closed via the solenoid valve, and a second cross section of the fluidic connection arranged between the pressure side and the control pressure space, wherein the first cross section is larger than the second cross section.

3. The control device as recited in claim 2, wherein the valve-closure body further comprises at least one opening, wherein the fluidic connection between the pressure side and the control pressure space is provided through the at least one opening.

4. The control device as recited in claim 3, wherein, when the bypass valve is in an open position, the first cross section is cleared between the control pressure space and the intake side via the solenoid valve, wherein the first cross section is larger than the at least one opening.

5. The control device as recited in claim 4, wherein the solenoid valve is an electric switch-over valve.

6. The control device as recited in claim 2, wherein the opening of the first cross section is configured to be adjustable.

7. The control device as recited in claim 6, wherein the solenoid valve is an electro-pneumatic pressure transducer.

8. The control device as recited in claim 7, wherein the electro-pneumatic pressure transducer comprises a mixed pressure port which is connected with the control pressure space.

9. The control device as recited in claim 7, further comprising a pressure-side port which is connected with the control pressure space, wherein the electro-pneumatic pressure transducer comprises a mixed pressure port which is connected with the intake side.

10. The control device as recited in claim 1, wherein the bypass valve is configured to be pressure-compensated in a closed position so that a resultant force of pneumatic forces acting on the valve-closure body is zero when the bypass valve is in the closed position.

11. The control device as recited in claim 1, wherein the bypass valve further comprises a valve housing, and wherein the control device further comprises a membrane which is connected to the valve-closure body and to the valve housing.

12. A control device for an internal combustion engine, the control device being arranged in a bypass duct between a pressure side and an intake side of a supercharging device, the control device comprising:
    a bypass valve comprising a valve-closure body which is configured to be pneumatically actuatable, and a control pressure space;
    a solenoid valve which is configured to open and close a fluidic connection between the pressure side and the atmosphere via the control pressure space, the solenoid valve being an electro-pneumatic pressure transducer comprising a mixed pressure port which is connected with the control pressure space;
    a first cross section which is configured to be opened or closed via the solenoid valve, an opening of the first cross section being configured to be adjustable; and
    a second cross section of the fluidic connection arranged between the pressure side and the control pressure space, wherein,
    the first cross section is larger than the second cross section,
    when the bypass valve is in a completely open position, the fluidic connection exists at least temporarily via the control pressure space between the pressure side and the atmosphere, and
    a closure of the fluidic connection brings about a resulting force in a closing direction on the valve-closure body.

13. The control device as recited in claim 12, wherein the valve-closure body further comprises at least one opening, wherein the fluidic connection between the pressure side and the control pressure space is provided through the at least one opening.

14. The control device as recited in claim 13, wherein, when the bypass valve is in an open position, the first cross section is cleared between the control pressure space and the atmosphere via the solenoid valve, wherein the first cross section is larger than the at least one opening.

15. The control device as recited in claim 14, wherein the solenoid valve is an electric switch-over valve.

16. The control device as recited in claim 12, further comprising a pressure-side port which is connected with the control pressure space, wherein the electro-pneumatic pressure transducer comprises a mixed pressure port which is connected with the atmosphere.

17. The control device as recited in claim 12, wherein the bypass valve is configured to be pressure-compensated in a closed position so that a resultant force of pneumatic forces acting on the valve-closure body is zero when the bypass valve is in the closed position.

18. The control device as recited in claim 12, wherein the bypass valve further comprises a valve housing, and wherein the control device further comprises a membrane which is connected to the valve-closure body and to the valve housing.

19. A control device for an internal combustion engine, the control device being arranged in a bypass duct between a pressure side and an intake side of a supercharging device, the control device comprising:
- a bypass valve comprising a valve-closure body which is configured to be pneumatically actuatable, and a control pressure space; and
- a solenoid valve which is configured to open and close a fluidic connection between the pressure side and the atmosphere via the control pressure space, the solenoid valve being an electro-pneumatic pressure transducer comprising a mixed pressure port which is connected with the atmosphere;
- a first cross section which is configured to be opened or closed via the solenoid valve, an opening of the first cross section being configured to be adjustable;
- a second cross section of the fluidic connection arranged between the pressure side and the control pressure space; and
- a pressure-side port which is connected with the control pressure space, wherein, the first cross section is larger than the second cross section, when the bypass valve is in a completely open position, the fluidic connection exists at least temporarily via the control pressure space between the pressure side and the atmosphere, and
a closure of the fluidic connection brings about a resulting force in a closing direction on the valve-closure body.

20. The control device as recited in claim 19, wherein the valve-closure body further comprises at least one opening, wherein the fluidic connection between the pressure side and the control pressure space is provided through the at least one opening.

21. The control device as recited in claim 20, wherein, when the bypass valve is in an open position, the first cross section is cleared between the control pressure space and the atmosphere via the solenoid valve, wherein the first cross section is larger than the at least one opening.

22. The control device as recited in claim 21, wherein the solenoid valve is an electric switch-over valve.

23. The control device as recited in claim 19, wherein the electro-pneumatic pressure transducer comprises a mixed pressure port which is connected with the control pressure space.

24. The control device as recited in claim 19, wherein the bypass valve is configured to be pressure-compensated in a closed position so that a resultant force of pneumatic forces acting on the valve-closure body is zero when the bypass valve is in the closed position.

25. The control device as recited in claim 19, wherein the bypass valve further comprises a valve housing, and wherein the control device further comprises a membrane which is connected to the valve-closure body and to the valve housing.

* * * * *